United States Patent
Messner

(10) Patent No.: US 6,971,864 B2
(45) Date of Patent: Dec. 6, 2005

(54) DEVICE FOR PRODUCING PLASTIC HOLLOW BODIES USING AN EXTRUSION BLOW MOLDING METHOD

(75) Inventor: Wolfgang Messner, Absam (AT)

(73) Assignee: Soplar SA, Altstatten (CH)

( * ) Notice: Subject to any disclaimer, the term of this patent is extended or adjusted under 35 U.S.C. 154(b) by 202 days.

(21) Appl. No.: 10/681,147

(22) Filed: Oct. 9, 2003

(65) Prior Publication Data

US 2004/0115291 A1    Jun. 17, 2004

Related U.S. Application Data

(63) Continuation of application No. PCT/CH02/00166, filed on Mar. 21, 2002.

(30) Foreign Application Priority Data

Apr. 10, 2001    (CH) .................................... 0671/01

(51) Int. Cl.[7] ........................ B29C 49/04; B29C 49/32
(52) U.S. Cl. ...................... 425/135; 425/150; 425/532; 425/538
(58) Field of Search ................ 425/532, 135, 425/150, 538, 540, 381, 133.1, 466, 192 R; 264/540, 542

(56) References Cited

U.S. PATENT DOCUMENTS

| | | | |
|---|---|---|---|
| 2,952,034 A | * | 9/1960 | Fortner ........................ 264/543 |
| 3,355,763 A | | 12/1967 | Willert |
| 3,516,118 A | * | 6/1970 | Gallay ........................ 425/168 |
| 3,640,661 A | * | 2/1972 | Gasior et al. ................ 425/159 |
| 3,738,788 A | * | 6/1973 | Langecker .................... 425/538 |
| 3,778,213 A | * | 12/1973 | Di Settembrini ............ 425/532 |
| 3,943,214 A | | 3/1976 | Turek |
| 4,022,561 A | * | 5/1977 | Strong ........................ 425/532 |
| 4,937,035 A | * | 6/1990 | Richter ....................... 264/515 |
| 5,399,302 A | * | 3/1995 | Noguchi et al. ............. 264/412 |
| 5,639,415 A | * | 6/1997 | Kato et al. .................. 264/532 |

FOREIGN PATENT DOCUMENTS

| | | |
|---|---|---|
| EP | 0 597 219 A1 | 5/1994 |
| EP | 0 769 358 A2 | 4/1997 |
| JP | 06 226824 | 8/1994 |

* cited by examiner

*Primary Examiner*—Robert B. Davis
(74) *Attorney, Agent, or Firm*—Buchanan Ingersoll PC

(57) ABSTRACT

An apparatus for producing plastic hollow bodies using an extrusion blow molding process has an extrusion unit, which is mounted in a housing, and at least one blow molding station. The extrusion unit has an extruder and an extruder head, connected to the extruder, with at least one extrusion nozzle. The longitudinal extent of the extruder defines a longitudinal direction of the apparatus. The blow molding station has a blow molding table with at least one molding tool, which is provided with an opening disposed on the side of the molding tool toward the extrusion nozzle. The blow molding table is movable on a lateral path, extending essentially perpendicular to the longitudinal direction, from a terminal position laterally of the extruder head into a position beneath the extruder head and back again, in order to make the extrusion nozzle and the opening of the molding tool coincide vertically with one another. The extrusion unit is supported vertically and laterally pivotably in the housing and is displaceable in the longitudinal direction.

18 Claims, 1 Drawing Sheet

DEVICE FOR PRODUCING PLASTIC HOLLOW BODIES USING AN EXTRUSION BLOW MOLDING METHOD

CROSS REFERENCE TO RELATED APPLICATIONS

This application claims priority under 35 U.S.C. §119 to Swiss Application 671/01 filed in Switzerland on 10 Apr. 2001, and as a continuation application under 35 U.S.C. §120 to PCT/CH02/00166 filed as an International Application on 21 Mar. 2002 designating the U.S., the entire contents of which are hereby incorporated by reference in their entireties.

BACKGROUND

The invention relates to an apparatus for producing plastic hollow bodies using an extrusion blow molding process.

The usual containers in the past, made of tinplate, non-ferrous sheet metal, glass, or even ceramic, are increasingly being replaced with containers of plastic. Particularly for packaging fluid substances such as beverages or oil, cleaning utensils, cosmetics, and so forth, primarily plastic containers are used. In this substitution, the low weight and lower costs can play a considerable role. The use of recyclable plastic materials, which can be produced with more-favorable overall energy consumption, also helps promote consumer acceptance of plastic containers, and especially plastic bottles.

Plastic containers and especially plastic bottles, for instance of polyethylene or polypropylene, are produced using an extrusion blow molding process, and especially a process for blow molding of tubing, or hoses. In this process, a hose extruded in a one or more layers is placed in blow-molding tools, inflated by overpressure using a blow molding mandrel, and cured by cooling. The extrusion blow molding machines used for this as a rule have at least one extruder for delivering the plastic material. The outlet of the extruder is connected to an extruder head, from whose outlet nozzle, whose opening width can preferably be regulated, the hose extruded in one or more layers emerges, preferably continuously. For the sake of continuous operation, in the known extrusion blow molding machines two stations with blow molds are provided, which are served in alternation by the extruder head. The blow molding stations are disposed opposite one another on both sides of the extruder and have blow molding tables that are moved to beneath the extruder head in alternation in order to receive the extruded hose. Overall, the extruder with the extruder head and the two blow molding stations is approximately T-shaped. The extruder and the extruder head form the long bar of the T, while the two blow molding tables are movable in alternation along the short halves of the crossbar to beneath the extruder head. The longitudinal extent of the extruder head will hereinafter be called the longitudinal direction of the extrusion blow molding machine.

In known extrusion blow molding machines, the extruder is connected solidly to the extruder head and is disposed in the frame of the machine. The correct positioning of the blow molds is done solely by means of a lateral displacement of the two blow molding tables that extends approximately at a right angle to the longitudinal direction. The extruder is often disposed on a platform and can be displaceable in its longitudinal direction on the platform. It can also be provided that the platform be raised and lowered as a unit together with the extruder and the extruder head connected to it. In extrusion blow molding machines that are intended for only one type of container, this arrangement generally suffices. It should be noted that in the known extrusion blow molding machines for containers with eccentric openings, such as containers with necks extending obliquely, the blow-molding tools in the two blow molding stations are embodied in mirror-inverted form. This means that two differently embodied molding tools are manufactured, and spare parts for them should be kept on hand. Because blow molding stations are mostly equipped with multiple tools, this can involve a considerable expense for producing the tools and keeping reserve tools on hand.

However, extrusion blow molding machines are often not used for only a single type of container. For a new type of container, the machine should be retrofitted. To that end, new molding tools should be installed in the blow molding tables of the blow molding stations, and the relative alignment of the blow molding tables and the extruder with the extruder head should be readjusted. For instance, the relative height of the extruder head to the blow molding tables is typically set up all over again. It can also be necessary to displace the extruder along with the extruder head in the longitudinal direction, so that the extrusion nozzle can be made to coincide with the blow mold opening. In known extrusion blow molding machines with a rigid extruder, the alignment can be a very complicated process, which can dictate a relatively long down time of the extrusion blow molding machine. Given the high investment costs for an extrusion blow molding machine, however, long down times are unwanted.

Upon the transfer of the extruded hose to the blow mold, the hose is severed. To prevent the continuously extruded hose from running out onto the surface of the blow mold, it is for instance provided that the blow molding tables, on moving laterally away, are simultaneously also lowered. This can involve relatively complicated guidance of the blow molding tables. In an alternative variant embodiment, the extruder head is lifted upward upon transfer, away from the surface of the blow mold. In the known extrusion blow molding machines, this can be done by raising the entire platform on which the extruder is mounted. Taking the weight of the extruder and the extruder head connected to it as well as the platform and all the devices disposed on it into account, it is quite evident that this embodiment is very energy-intensive, and only with difficulty can quick, fast readjustment of the extruder head be accomplished.

SUMMARY

An exemplary apparatus to produce plastic hollow bodies is disclosed in which the expense for production and storage of molding tools can be reduced. The apparatus can enable simpler retrofitting and alignment of the blow molding tables on the extruder together with the extruder head. Time-consuming retrofitting and long down times of the extrusion blow molding machine can be avoided. In operation, position corrections can be performed simply, so as to compensate for instance for hose travel effects, air movements, movements of the hose caused by static charges, and so forth. In addition, compensating for oscillations, such as vibrations, in the extrusion unit can be established, so that swinging of the extruded hoses can be prevented. The extruded hose can be prevented from running onto the blow mold surface upon transfer of the hoses to the blow mold. Fast position corrections can also be provided.

According to exemplary embodiments of the invention, an apparatus for producing plastic hollow bodies using an extrusion blow molding process is disclosed. An apparatus for producing hollow bodies of plastic by the extrusion blow molding process has an extrusion unit, which is mounted in a housing frame, and at least one blow molding station. The extrusion unit has an extruder and an extruder head, connected to the extruder, with at least one extrusion nozzle. The longitudinal extent of the extruder defines a longitudinal direction of the apparatus. The blow molding station has a blow molding table with at least one molding tool, which is provided with an opening disposed on the side of the molding tool toward the extrusion nozzle. The blow molding table is movable on a lateral path, extending essentially perpendicular to the longitudinal direction, from a terminal position laterally of the extruder head into a position beneath the extruder head and back again, in order to make the extrusion nozzle and the opening of the molding tool coincide vertically with one another. The extrusion unit is supported vertically and laterally pivotably in the housing and is displaceable in the longitudinal direction.

Because of the pivotable support and the displaceability of the extrusion unit in the longitudinal direction of the apparatus, virtually arbitrary adjustability of the extruder head can be provided. The extruder head thus has adjustment options in all three directions in space and makes dynamic correction of the position of the extruder head possible. This can facilitate the alignment of the laterally feedable blow molding station with the extrusion nozzle. Long setup times can be avoided. Molding tools for hollow bodies with eccentric openings can be simpler in design, since after all, the extruder head is disposed in a way that is simple to adjust, and deviations from center can be compensated. In particular, with an extrusion unit disposed in accordance with an exemplary embodiment of the invention, it does not matter from which side the blow molding table is infed. It is therefore no longer necessary to make mirror-inverted molding tools available. This can reduce the production costs for the molding tools, and the expense for keeping spare parts on hand can be reduced. To prevent the extruded hose from running out onto the blow mold surface upon transfer of the hose to the blow mold, essentially all that has to be done is to raise the extruder head, and this can be accomplished very simply and quickly because of the pivotable support of the extrusion unit.

In an arrangement that is advantageous in terms of construction, the pivotable support of the extrusion unit is provided in a region of its center of gravity, in an end region of the extruder remote from the extruder head. In particular, it proves expedient to provide the pivotable support in the region of the gear for the extruder worm. As a result, the gear unit can be largely decoupled from forces of gravity of the extruder and can be essentially loaded only by the driving forces for the extruder worm that are to be transmitted. The drive unit for the extruder worm can expediently form a counterweight to balance the extrusion unit, so that the forces of gravity in the region of the extruder head can be kept small.

For the displaceability of the extrusion unit in the longitudinal direction, the support can be provided on a carriage that is adjustable translationally in the longitudinal direction.

To increase the mobility, the extruder head can be connected pivotably to the extruder. Upon an adjustment of the extruder head, the extruder therefore need not travel the entire adjustment path along with the extruder head. This also reduces vertical and lateral adjustments of the extruder head essentially to pivoting motions of the extruder about the pivotable support. Advantageously, the pivot connection of the extruder head to the extruder has two degrees of freedom. One degree of freedom allows pivoting the extruder head in a vertical plane relative to the extruder. The second degree of freedom allows an approximately lateral pivotability of the extruder head.

The extruder head can be retained in a frame part in such a way that its position is adjustable vertically, in the longitudinal direction, and in the lateral direction, transversely to the longitudinal direction. As a result, for the extruder head, all the adjustment options for making the extrusion nozzle coincide vertically with the opening in the molding tool can be provided. It proves especially advantageous in this respect that even if the blow molding station is not brought exactly laterally into position, or in the event of a molding tool with an eccentric opening, the extruder head can still be moved into the exact position.

The individual adjustment of the extruder head in one adjustment direction can be accomplished independently of the other adjustment options. For this purpose, a separate adjusting drive mechanism, preferably an electric servo motor, can be provided for each of the adjustment options. In a highly advantageous refinement of the invention, the adjusting drive mechanisms can be triggerable via a central control unit. The control unit advantageously cooperates with positioning aids, which are disposed on the extruder head and/or on the blow molding table. This makes fully automatic control off the adjustment of the extruder head possible. The adjustment of the extruder head is effected via predeterminable control data and/or with the aid of positioning data, ascertained on-line, for the positioning aids. For ascertaining oscillations of the extruder head, oscillation sensors, such as acceleration sensors, can be provided, whose measurement values are sent to the control unit so that from them, dynamic position corrections can be ascertained and brought about.

For continuous operation of the extrusion blow molding apparatus, two blow molding stations can be provided. The two blow molding stations can be disposed in a T shape on both sides of the extruder that forms the long bar of the T. In continuous operation of the apparatus, the blow molding tables of the blow molding stations can be moved in alternation, along a lateral path extending essentially perpendicular to the longitudinal direction, out of their terminal position laterally of the extruder head to beneath the extruder head and back again, in order to make the extrusion nozzle and the openings in the molding tools coincide vertically with one another. Because of the option of readjusting the extruder head to the required position, it is unnecessary, even for producing containers with an eccentric opening, to equip the blow molding stations with mirror-inverted molding tools. Instead, both blow molding tables can have identically embodied molding tools. The resultant deviation in the position of the opening of one molding tool from an exactly centered position can be compensated for very simply by means of a corresponding readjustment of the extruder head. This is made possible by using a pivotably supported extrusion unit.

For economical mass production of the containers, it is expedient if each extruder head has a plurality of extrusion nozzles. The extrusion nozzles are all supplied with plastic material by the extruder. Accordingly, each blow mold can also be embodied as a multiple tool with multiple cavities. The number of cavities can, for example, match the number of extrusion nozzles. In the infeeding motion of the blow molding table to beneath the extruder head, the openings in the cavities can be made to coincide vertically with the extrusion nozzles on the extruder head. The adjustability of the extruder head makes the alignment easier, especially when there are multiple tools.

BRIEF DESCRIPTION OF THE DRAWINGS

The invention is described in further detail below in conjunction with the schematic drawings. Shown schematically and not to scale are.

DETAILED DESCRIPTION

Figure 1:
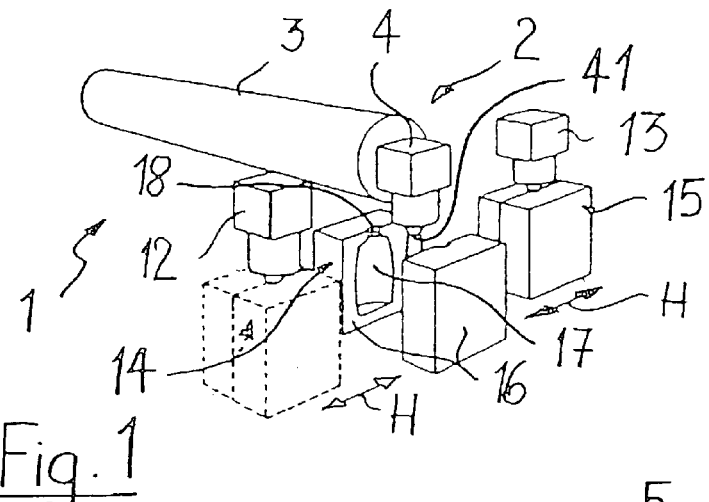
FIG. 1, a basic illustration of an exemplary extrusion blow molding machine with an extrusion unit and two blow molding stations.

An exemplary extrusion blow molding machine, shown only basically in FIG. 1, is identified overall by reference numeral 1. The structure of such extrusion blow molding machines is well know and is described for instance in "Blow molding handbook", edited by Donald V. Rosato and Dominick V. Rosato, 1989, ISBN 1-56990-089-2, Library of Congress Catalog Card No. 88-016270. The illustration in FIG. 1 is therefore limited to those components of the extrusion blow molding machine 1 that are absolutely necessary for comprehension. The machine is for instance a two-station blow molding machine, of the kind also sold by the present applicant. It has an extrusion unit 2 and two blow molding stations 12, 13. The extrusion unit 2 includes an extruder for plastic granulate and an extruder head 4, communicating with it, which has at least one extrusion nozzle 41. The longitudinal extent of the extruder 3 defines a longitudinal direction of the extrusion blow molding machine 1. Each of the blow molding stations 12, 13 has one blow molding head and one blow molding mandrel. Each blow molding station 12, 13 is equipped with a blow molding table 14, 15, in which the molding tools 16 are mounted. Each of the molding tools encloses a cavity 17, which corresponds in shape to that of the container, such as a bottle, to be produced, and on its top toward the extruder head 4, each molding tool has an opening 18. The blow molding tables 14, 15 are displaceable in alternation from their lateral terminal positions into a position in which the opening 18 of the molding tool 16 coincides vertically with the extrusion nozzle 41. The lateral displacement of the blow molding tables 14, 15 is effected essentially perpendicular to the longitudinal direction of the extrusion blow molding machine 1.

The plastic granulate supplied via the extruder 3 is melted in the extruder 3 and/or in the extruder head 4 and is extruded as an endless hose at the extrusion nozzle 41. The hose can be extruded in a single layer or multiple layers. To that end, additional extruders, which transport the requisite different plastic materials to the extruder head 4, can also be provided. The blow molding tables 14, 15 with the molding tools 16 are moved in alternation from their terminal positions into the blow molding stations 12, 13 laterally beneath the extruder head 4; the molding tools 16 are opened, and a piece of extruded hose is retrieved. After that, the applicable blow molding table 14, 15 is moved back into its terminal position in the blow molding station 12, 13. There, with the aid of a blow molding mandrel introduced through the opening into the cavity, the container is inflated. The finished container is expelled, and the cycle is repeated. While one container is being inflated in one blow molding station 12, the blow molding table 15 in the second blow molding station 13 is moved laterally beneath the extruder head 4, in order to retrieve a further piece of the extruded hose. In this way, continuous operation is made possible.

Figure 2:
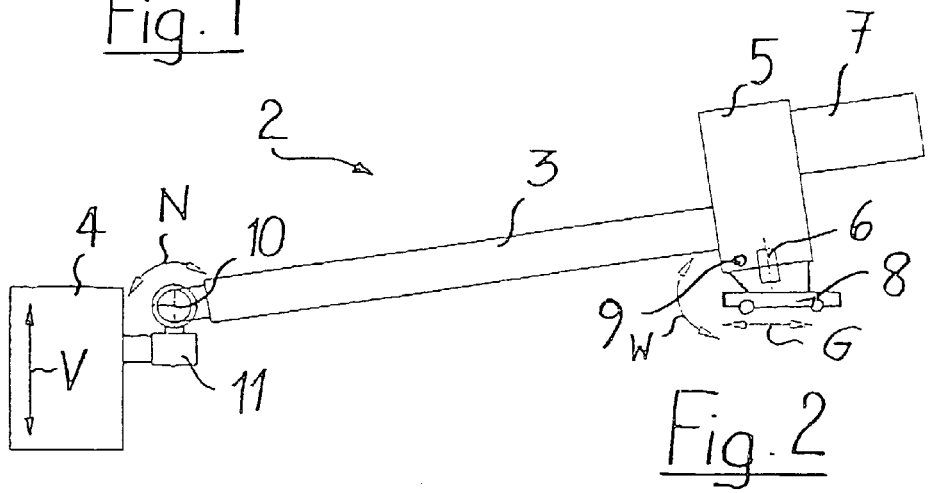
FIG. 2, a side view of an extrusion unit embodied according to an exemplary embodiment of the invention.
Figure 3:
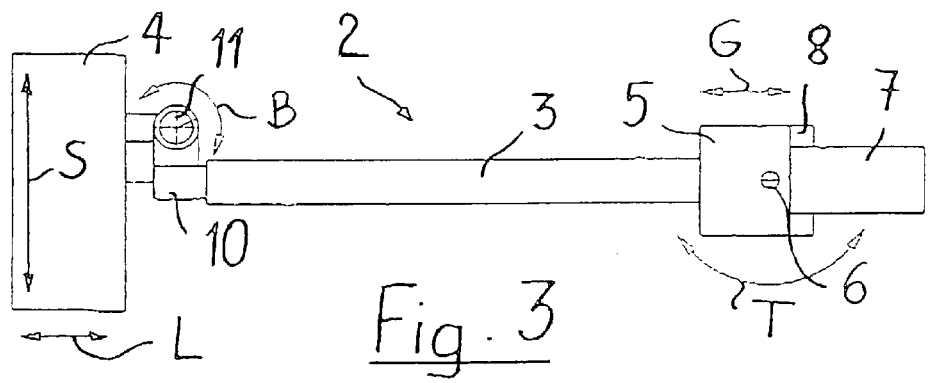
FIG. 3, a plan view on the extrusion unit of FIG. 2.

In FIGS. 2 and 3, the extrusion unit 2 of an extrusion blow molding machine, modified according to an exemplary embodiment of the invention, is shown schematically in a side view and plan view, respectively. Once again, the extrusion unit 2 has the extruder 3 and the extruder head 4 communicating with the outlet of the extruder 3. The extrusion unit 2 is balanced because of the fact that its center of gravity is located essentially in the region of the gear for the extruder 3. The gear is disposed in a gearbox 5. A drive unit 7 for the extruder 3 is flanged to the gearbox 5 and acts as a counterweight to the extruder 3.

In a distinction from the known extrusion blow molding machines, the extrusion unit 2 is supported pivotably in the housing of the extrusion blow molding machine and is displaceable in the longitudinal direction. The pivotable support is effected in the region of the gear for the extruder 3. To that end, a vertical extruder joint 9 is provided on the gearbox 5 and makes a vertical inclination of the extruder 3 possible. The vertical mobility is represented in FIG. 2 by the double arrow W. The gearbox 5 is disposed on the guide carriage 8 and is pivotable substantially horizontally about an axis 6. The horizontal pivotability is represented in the plan view of FIG. 3 by the double arrow T. The guide carriage 8 is guided via rollers or wheels, for instance, on rails that are provided on a platform of the extrusion blow molding machine and extend in the longitudinal direction of the machine. The guide carriage 8 makes a simple, controlled displaceability of the extrusion unit 2 in the longitudinal direction possible, as indicated in FIGS. 2 and 3 by the double arrow G. Because of the type of support selected, the extrusion unit 2 is movable vertically and laterally and can also be displaced in controlled fashion in the longitudinal direction of the extrusion blow molding machine.

In contrast to the known extrusion blow molding machines, in the exemplary embodiment of the invention shown, the extruder head 4 is pivotably connected to the extruder 3. The pivot connection has two degrees of freedom and makes both a vertical and a substantially lateral pivotability of the extruder head 4 relative to the extruder 3 possible. The pivot connection is formed for instance by two tubular joints 10, 11, extending essentially perpendicular to one another. The vertical inclinability of the extruder head in the vertical tubular joint 10 is represented, in the side view of FIG. 2, by the double arrow N. In FIG. 3, the double arrow B represents the horizontal pivotability of the extruder head about the tubular joint 11. The extruder head 4 is suspended in a frame part of the housing of the extrusion blow molding machine in such a way that adjustability in all three coordinate directions exists. Because of the pivot connection of the extruder head 4 to the extruder 3 on the one hand, and the support of the extrusion unit 2 that is both pivotable and longitudinally displaceable, the motions of the extruder head 4 are converted into tilting/pivoting motions of the extruder 3, and the following sequences of motion result:

a vertical motion of the extruder head 4 in the direction of the double arrow V leads to a slight inclination represented by the double arrow N in the tubular joint 10 and a slight inclination W in the extruder joint 9 as well as a longitudinal displacement indicated by the arrow G;

a horizontal motion of the extruder head 4 perpendicular to the longitudinal direction, in the direction of the double arrow S, leads to a rotation in accordance with the double arrow B in the tubular joint 11, a rotation T in the extruder joint 6, and a longitudinal displacement G;

a horizontal motion of the extruder head 4 in the longitudinal direction L results in a longitudinal displacement G of the carriage support of the extrusion unit 2.

The adjustment of the extruder head 4 is accomplished with the aid of adjusting drive mechanisms, such as electric servo motors. They advantageously cooperate with a central control unit, not identified by reference numeral in the drawings. This creates the possibility of dynamic, automated alignment. On the extruder head 4 and/or on the blow molding tables, positioning sensors can be provided, which cooperate with the central control unit and thereby enable a simple, dynamic readjustment in the positioning and alignment of the blow molding tables under the extrusion nozzle of the extruder head 4. Oscillations of the extrusion unit 2, for instance in the longitudinal direction, can be detected with oscillation sensors, such as acceleration sensors, and compensated for on-line by means of suitable dynamic readjustment of the position of the extruder head 4.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for producing plastic hollow bodies using a extrusion blow molding process, comprising:
    an extrusion unit, which has an extruder defining a longitudinal direction of the apparatus, the extruder unit being mounted in a housing frame;
    an extruder head connected to the extruder and having at least one extrusion nozzle; and
    at least one molding tool, which is provided with an opening disposed on a side of the molding tool toward the extrusion nozzle, and which is movably mounted along a lateral path extending essentially perpendicular to the longitudinal direction from a terminal position laterally of the extruder head into a position beneath the extruder head and back again, such that the extrusion nozzle and the opening of the molding tool coincide vertically with one another, the extrusion unit being vertically inclinable and laterally pivotable in the housing by a pivotable support, and being mounted for displacement in the longitudinal direction.

2. The apparatus of claim 1, wherein the pivotable support is provided in a region of a center of gravity of the extrusion unit, in an end region of the extruder remote from the extruder head.

3. The apparatus of claim 2, wherein the pivotable support is provided in a region of a gear for the extruder.

4. The apparatus of claim 1, wherein the extrusion unit is supported on a carriage that is movable in the longitudinal direction.

5. The apparatus of claim 1, wherein a extruder head is pivotably connected to the extruder.

6. The apparatus of claim 5, wherein the pivot connection of the extruder head to the extruder has two degrees of freedom.

7. The apparatus of claim 6, wherein the extruder head is retained in a frame part, and its position is adjustable vertically, in the longitudinal direction, and in a lateral direction transversely to the longitudinal direction.

8. The apparatus of claim 7, wherein for each adjustment option, adjusting drive mechanisms are provided.

9. The apparatus of claim 8, wherein the adjusting drive mechanisms are triggerable via a central control unit, which cooperates with positioning aids that are disposed on the extruder head and/or on the blow molding table.

10. The apparatus of claim 9, wherein the sensors detect oscillations of the extruder head, and cooperate with the control unit.

11. The apparatus of claim 1, comprising:
    two blow molding stations, whose blow molding tables are disposed in a T-shaped pattern to both sides of the extruder and are movable in alternation, along a lateral path extending essentially perpendicular to the longitudinal direction, from a terminal position laterally of the extruder head to beneath the extruder head and back again, to make the extrusion nozzle and the openings of the molding tools coincide vertically with one another.

12. The apparatus of claim 1, wherein the extruder head has a plurality of extrusion nozzles, which can be supplied simultaneously with plastic material by the extruder, and each blow mold is embodied as a multiple tool with a plurality of cavities, and the number of cavities corresponds to the number of extrusion nozzles.

13. The apparatus of claim 3, wherein the extrusion unit is supported on a carriage that is movable in the longitudinal direction.

14. The apparatus of claim 13, wherein the extruder head is pivotably connected to the extruder.

15. The apparatus of claim 8, wherein the drive mechanisms are electric servo motors.

16. The apparatus of claim 10, wherein the sensors are acceleration sensors.

17. The apparatus of claim 14, comprising:
    two blow molding stations, whose blow molding tables are disposed in a T-shaped pattern to both sides of the extruder and are movable in alternation, along a lateral path extending essentially perpendicular to the longitudinal direction, from a terminal position laterally of the extruder head to beneath the extruder head and back again, to make the extrusion nozzle and the openings of the molding tools coincide vertically with one another.

18. The apparatus of claim 17, wherein the extruder head has a plurality of extrusion nozzles, which can be supplied simultaneously with plastic material by the extruder, and each blow mold is embodied as a multiple tool with a plurality of cavities, and the number of cavities corresponds to the number of extrusion nozzles.

* * * * *